United States Patent Office 3,284,540
Patented Nov. 8, 1966

3,284,540
ALKYD COPOLYMERS OF HALOGEN-CONTAINING PHOSPHONIUM MONOMERS AND POLYMERS
Gaetano F. D'Alelio, South Bend, Ind., assignor, by direct and mesne assignments, to Dal Mon Research Co., Cleveland, Ohio, a corporation of Delaware
No Drawing. Filed Mar. 15, 1965, Ser. No. 440,009
6 Claims. (Cl. 260—869)

This application is a continuation-in-part of applicant's copending application, Serial No. 215,261, filed August 7, 1962, now abandoned.

This invention is concerned with a new class of monomers and polymers. Generally, it deals with flame-resistant polymers, that is, polymers of the self-extinguishing type. Particularly, it deals with halogenated-alkenyl phosphate esters and polymers derived therefrom. Most particularly it deals with alkyd copolymers of such monomers.

It has been known for some time that certain diallyl phosphonate polymers are of the self-extinguishing type, and it was assumed that this property is due to the presence of the phosphorus atom. This assumption was shown to be incorrect by comparing a number of phosphonates for this property (JACS, 76, 2195 (1954)), and it was shown that diallyl phenyl phosphonate, which contains 13% phosphorus had good flame resistant properties whereas triallyl phosphate, $PO(OCH_2CH=CH_2)_3$, which contains 14.2% phosphorus, and diallyl phosphite, $HO-P(OCH_2CH=CH_2)_2$, which contains 19.2% phosphorus, have very poor flame resistance.

It is an object, therefore, of this invention to prepare a class of polymerizable phosphonates which are very good or excellent in flame resistant properties. It is a further objective of this invention to prepare flame resistant polymers and copolymers from these monomers. These objectives are accomplished by preparing and polymerizing halogen-containing unsaturated phosphonium esters.

The halogenated phosphonium unsaturated esters of this invention contain at least two halogen atoms attached to a carbon atom of the molecule and have the formula $Z(A)_n$, wherein Z represents a radical selected from the class of hydrocarbon, halogenated hydrocarbon radicals and derivatives thereof as described below, each Z radical having at least one aliphatic carbon atom therein, n represents a numerical value of 1 to 6, and A represents a radical of the structure

at least one of which is attached to an aliphatic carbon atom of Z, wherein K is selected from the class of OR (including OR'), OM, and NR$_2$, M is selected from the class of hydrogen, ammonia, amino groups, and monovalent and polyvalent metals, R' is an unsaturated hydrocarbon or halogenated hydrocarbon radical possessing a terminal $CH_2=C<$ group containing 2 to 12 carbon atoms, R is selected from the class of hydrogen, hydrocarbon radicals (including R' radicals) containing 1 to 20 carbon atoms and halogenated derivatives thereof, preferably there being at least two OR' groups in the $Z(A)_n$ molecule. The two OR' groups can be in the same A radical or in separate A radicals.

For optimum flame resistance it is preferred that the sum of halogen and phosphorus atoms amounts to at least about 21% by weight of the monomer. In these compounds, the halogen atoms are attached preferably to the Z radical but they can also be present in the OR or OR' groups of the phosphonium ester moiety. Preferably the halogen atoms are attached to the radical Z because of improved hydrolytic and/or thermal stability particularly if Z comprises an aromatic nucleus.

The radical Z contains 1 to 20 or more carbon atoms and contains at least one aliphatic carbon atom to which is attached an A group. Since the monomer contains two OR' groups, insoluble, infusible polymers can be obtained from these monomers. When K represents a group other than OR', then at least two

structures should be present in the monomer (i.e. n is at least two) if crosslinked polymers are desired. Otherwise, if n is one, polymerizability is reduced but such monomers are extremely useful in copolymerization processes with other monomers.

When n is greater than one, the A groups are attached to two different carbon atoms of the Z group. The halogen atoms in these monomers and polymers may be fluorine, chlorine, bromine and iodine. For economic reasons bromine and chlorine are preferred. The residual valencies of the Z group not occupied by $(A)_n$ or hydrogen are occupied by halogen atoms or radicals selected from the class consisting of acyloxy, alkoxy, cycloalkoxy, aryloxy, cyano, carbamido, sulfamido, amino, carboxylate and the corresponding derivatives of OR. When halogen atoms are present in the

group, then no halogens are necessary in the Z group, although when a higher halogen content is desired in the monomer, halogen atoms may be located in both the Z and

groups.

The monomers of this invention are readily prepared by the well-known Arbuzov reaction, that is, by reacting a suitable phosphite ester with a halohydrocarbon:

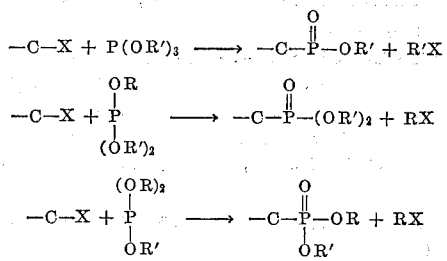

A few typical examples of this reaction are:

(1)

(2)
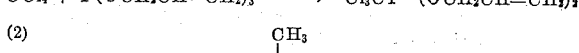

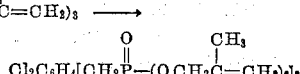

(3)
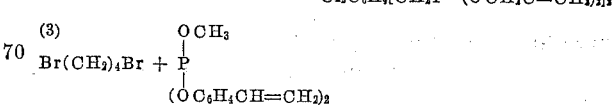

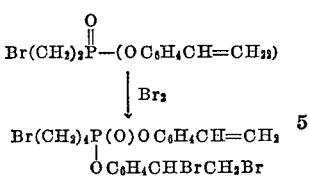

The halogen atoms in the phosphonium ester moiety may be introduced by halogenating the ester, thus (4)
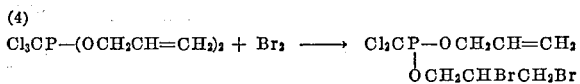

(5)
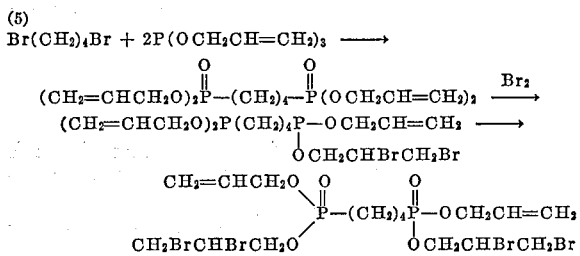

and
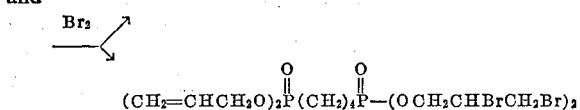

The halogen atoms may also be introduced into the phosphonium moiety by using a halogenated phosphite ester, e.g.,

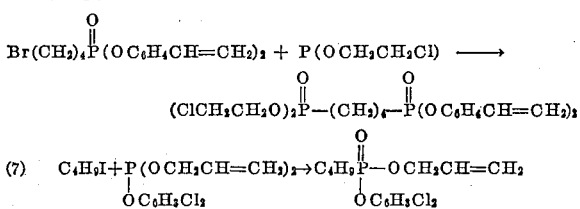

(7) $C_4H_9I + P(OCH_2CH=CH_2)_3 \rightarrow C_4H_9\overset{O}{\underset{OC_6H_3Cl_2}{\|}}P-OCH_2CH=CH_2$ A few illustrative examples of the halogenated hydrocarbon Z groups in monomers and polymers of this invention are

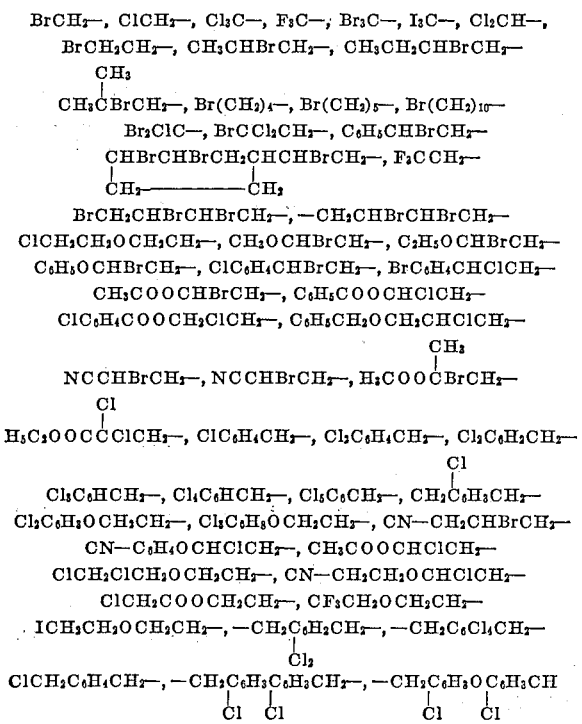

etc.

These Z groups correspond to a hydrocarbon radical that has at least 1 hydrogen atom replaced by a halogen atom and the residual valencies not occupied by halogens or hydrogen are occupied by OR groups and the halogeno, acyloxy, alkoxy, aryloxy, cyano, amino, sulfamido, carbamido, and carboxylate derivatives of OR groups. Other functional groups can also be present on the Z and OR groups provided they do not interfere with the desired reactions and properties of the compounds.

When halogen atoms are present in the phosphonium group, either in K or R', then the Z group can contain halogen as in the above group or be free of halogen, such as $CH_3$—, $C_2H_5$—, $C_3H_7$—, $CH_3CH_2OCH_2CH_2$—, $$CH_3COOCH_2CH_2—$$

$C_6H_5CH_2CH_2$—, $CH_3C_6H_4CH_2$—, $$CH_3COOC_6H_4CH_2CH_2—$$

$C_6H_{11}OCH_2CH_2$—, $CH_3COOC_6H_{10}$—, $CN—C_6H_4CH_2$—, $$CN—CH_2CH_2OC_6H_4CH_2CH_2—$$

$CH_3OOCC_6H_4CH_2$—, $C_{10}H_7CH_2$—, $$C_6H_5C_6H_4CH_2CH_2—$$

$C_6H_5C_6H_4CH_2$—, $C_6H_5OC_6H_4CH_2$—, $$C_6H_5NHC_6H_4CH_2—$$

$C_6H_5SC_6H_4CH_2$—, $C_6H_5SONH—C_6H_4CH_2$—, $$—CH_2C_6H_4CH_2—$$

—$CH_2C_6H_4C_6H_4CH_2$—, —$CH_2C_6H_4C_6H_4CH_2CH_2$—, $$C_6H_3(CH_2—)_3$$

—$CH_2C_6H_4C_6H_3(CH_2—)_2$, $$(—CH_2)_3C_6H_2C_6H_2(CH_2—)_3$$

$C_{10}H_2(CH_2—)_6$, etc.

Typical examples of the unsaturated radical R' are

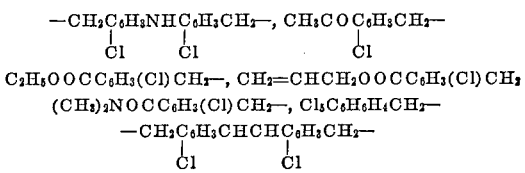
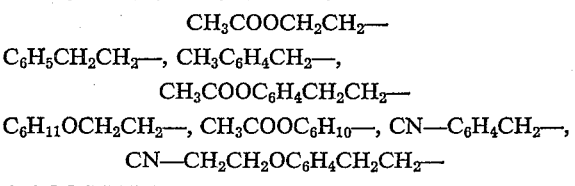

etc.

Illustrative examples of halogenated derivatives of R which may be used as in the phosphonium ester, if desired, are —$CH_2CHBrCH_2Br$, —$CHClCH_2Cl$, $$CH_2CClBrCH_2Br$$

—$CH_2CH_2Cl$, —$CH_2CCl_3$, —$CH_2CF_3$, $$—(CH_2)_{10}CH=CH_2$$

—$C_6H_4CHBrCH_2Br$, —$C_6H_4CH_2CHClCH_2Cl$, $$—CH_2CCl_2CCl_2CHClCH_2Cl$$

—$CH_2CHBrCHBrCHBrCH_2Br$.

The hydrocarbon radicals R containing 1 to 20 carbon atoms may be alkyl, aryl, aralkyl, alkaryl, cycloalkyl, etc., and may be saturated or unsaturated with ethylenic or acetylenic unsaturation, and when R contains 2 to 12 carbon atoms and possesses terminal

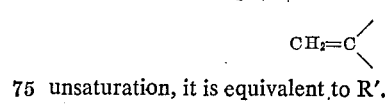

unsaturation, it is equivalent to R'.

The following examples illustrate the practice of this invention. These examples are given merely to illustrate the practice of the invention and are not intended to limit the scope of the invention nor the manner in which it can be practiced. Parts and percentages, unless specified otherwise, are by weight. Reference to polymers or polymerization throughout the specification are intended to include copolymers and copolymerizations.

EXAMPLE I

One hundred fifty-four (154) parts of carbon tetrachloride, 100 parts of triallyl phosphite, 0.3 part of dinitro ortho cresol are heated at reflux for 4–5 hours or until allyl chloride is no longer liberated, following which the excess carbon tetrachloride is removed at atmospheric pressure by distillation to 80° C. leaving the product

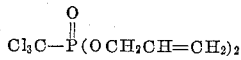

which is collected at a reduced pressure of 5–20 mm. in the range of 60–90° C. Elemental analysis for chlorine and phosphorus gives values of 39.72% Cl and 11.55% P, which are in good agreement with the theoretical values of 39.8% Cl and 11.6% P.

When an equivalent amount of carbon tetrabromide is used instead of carbon tetrachloride, the corresponding compound, $$Br_3C-\overset{O}{\underset{\|}{P}}(OCH_2CH=CH_2)_2$$

is obtained. When trifluoromonoiodo methane is used instead of the tetrachloride, then the corresponding fluoro derivative is obtained

EXAMPLE II

Example I is repeated using an equivalent weight of trimethallyl phosphite instead of allyl phosphite and the corresponding monomers are obtained:

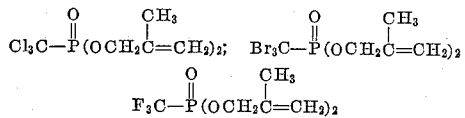

EXAMPLE III

Example I is repeated using tri(γ-chloro-allyl) phosphite instead of triallyl phosphite and the corresponding esters are obtained:

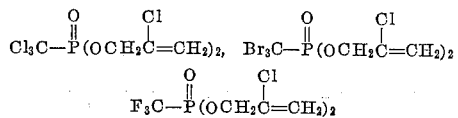

EXAMPLE IV

Example I is repeated using 253 parts of tribromomethane and 202 parts of triallyl phosphite and when 120 parts of allyl bromide are collected from the reaction, there remains a residue comprising

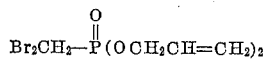

which is purified by distillation at 10–15 mm. pressure.

EXAMPLE V

Example IV is repeated using 267 parts of ethylene tribromide instead of the tribromomethane and there is obtained the product

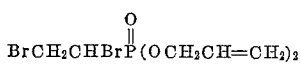

With ethylene trichloride the corresponding compound is obtained:

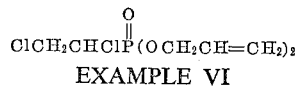

EXAMPLE VI

When 295 parts of 1,2,3-tribromobutane is used instead of the ethylene tribromide of Example V, there is obtained the compound

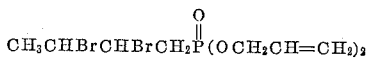

whereas 295 parts of 1,2,4-tribromobutane yields the monomer

and 309 parts of 1,2,5-tribromopentane yields

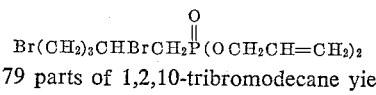

whereas 379 parts of 1,2,10-tribromodecane yields

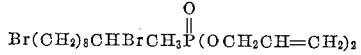

EXAMPLE VII

Example I is repeated using 295 parts of monochlorotribromo methane instead of carbon tetrachloride and there is obtained the product

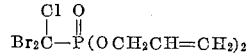

EXAMPLE VIII

Example IV is repeated using 1,2-dibromo-1,1-dichloroethane instead of tribromomethane and there is obtained the compound

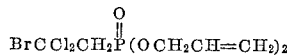

EXAMPLE IX

Three hundred and two (302) parts of tetrabromo-(vinylcyclohexene) and 202 parts of triallyl phosphite are reacted by the procedure of Example IV, and there is obtained the monomer

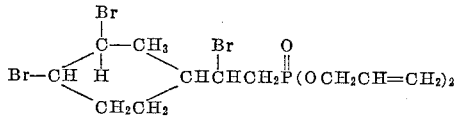

EXAMPLE X

Three hundred forty-three (343) parts of (1,2,2-tribromoethyl)-benzene and 202 parts of triallyl phosphite are reacted by the procedure of Example IV and there is obtained the product

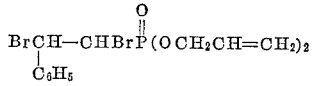

EXAMPLE XI

Example IV is repeated using 374 parts of 1,2,3,4-tetrabromobutane instead of the dibromomethane and there is obtained the compound

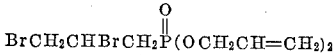

EXAMPLE XII

Example XI is repeated using 182 parts of 1,2,3,4-tetrabromobutane instead of 374 parts of the tetrabromide and there is obtained the compound

EXAMPLE XIII

Example IV is repeated using 142 parts of β,β' dichloroethyl ether instead of the dibromomethane and there is obtained the compound

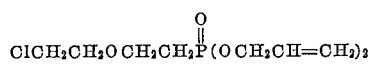

EXAMPLE XIV

Example V is repeated using 94 parts of ethylene dibromide and there is obtained the compound

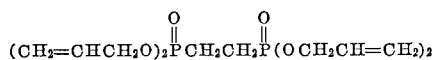

of which 354 parts are dissolved in 800 parts of ethylene dichloride and to this solution is added 160 parts of bromine at room temperature, following which the ethylene dichloride is removed at 15 mm. pressure, leaving the compound containing three polymerizable

groups of the structure

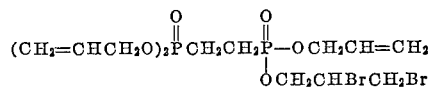

containing 31.42% bromine and 12.06% phosphorus which is in good agreement with the theoretical values of 31.35% and 12.15% for the compound.

The preferred monomers falling within the definition of the formula $Z(A)_n$ but having superior properties and greater ease in preparation, and therefore much preferred over the other species of this invention, are those represented by the formula

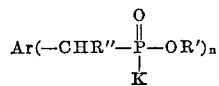

wherein $n$, R′ and K are as defined above, R″ is preferably hydrogen but can also be an alkyl group of no more than 6 carbon atoms, and Ar is an aromatic radical such as derived from benzene, naphthalene, diphenyl, terphenyl, diphenyl oxide, diphenyl ethane, diphenyl ethylene, etc., and various derivatives thereof such as the hydrocarbon, halo, acyloxy, alkoxy, aryloxy, carboxylate, carbalkoxy, mercapto, amido and amino derivatives.

Typical Ar groups, by way of illustration, are: $C_6H_5$—;
—$C_6H_4$—; $C_{10}H_6$—; $C_{10}H_7$; —$C_{10}H_5$—; —$C_6H_4C_6H_4$—;
—$C_6H_3C_6H_3$—; —$C_6H_3OC_6H_3$; —$C_6H_3SC_6H_3$—;
$C_6H_4CH_2CH_2C_6H_4$—
—$C_6H_3CH_3C_6H_3$—; —$C_6H_4CH$=$CHC_6H_4$;
$C_2H_5OC_2H_5$—
—$C_6H_4(OC_4H_9)$—; —$C_{10}H_6(COOCH_3)$—;
—$C_{10}H_6(OC_3H_7)$—; —$C_6H_3(SC_2H_5)$—;
—$C_6H_3$—$N(CH_3)_2$—
—$C_6H_4OCH_2CH_2OOCCH_3$; —$C_6H_3CON(CH_3)_2$;
—$C_6H_3N(CH_3)OCCH_3$
$Cl_5C_6$—; $Cl_3C_6H_2$—; $Br_2C_6H_3$—; $IC_6H_4$—; $F_3C_6H_2$;
$Cl_2C_6H_2$—$C_6H_4$—; $Cl_2C_6H_3OC_6H_4$—;
$CH_3OC_6H_4$—$C_6H_2(Cl)_2$—
etc.

A few typical examples of such compounds are:

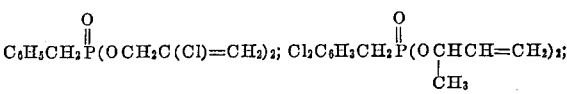

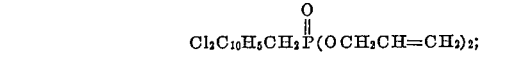

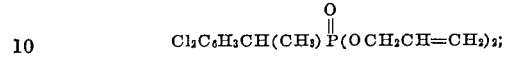

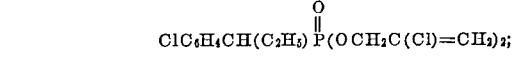

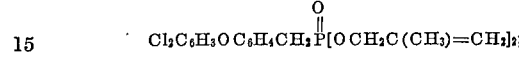

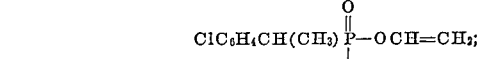

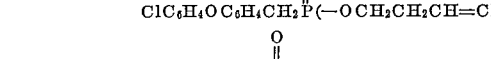

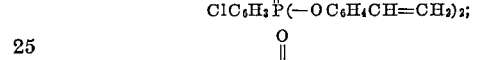

etc.

Such preferred compounds are further illustrated in the following Examples XV–XXV, XXXIV–XXXVI, and certain parts of Examples XXVII–XXXIII.

EXAMPLE XV

One hundred sixty-two (162) parts of p-chlorobenzyl chloride, 404 parts of triallyl phosphite and 0.5 part of dinitro-o-cresol are heated 10 hours at 90° C. in a suitable reactor and the reaction product distilled at 10 mm. pressure to remove excess triallyl phosphite, leaving a relatively pure product of

which may be used as such, or it may be distilled at reduced pressure of 1.5 mm. and the fraction boiling at 143–153° C. collected. On analysis for chlorine and phosphorus, this product gives values of 12.39% Cl and 10.72% P, which are in good agreement with the theoretical calculated values of 12.46% Cl and 10.8% P.

When 494 parts of trimethallyl phosphite are substituted for the triallyl phosphite of this example, then there is obtained the compound

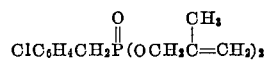

whereas when 494 parts of tributenyl phosphite are used, there is obtained the compound

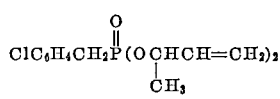

and when 520 parts of tri(2-chloroallyl)phosphite are used, there is obtained the derivative

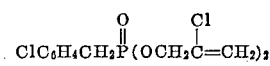

Also when 380 parts of trivinyl phosphite are used instead of the triallyl phosphite, the corresponding

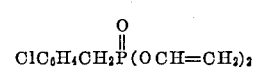

is obtained.

EXAMPLE XVI

The procedure of Example XV is repeated using triallyl phosphite individually with (a) 196.5 parts of dichlorobenzyl chloride
(b) 231.0 parts of trichlorobenzyl chloride
(c) 265.5 parts of tetrachlorobenzyl chloride
(d) 300.0 parts of pentachlorobenzyl chloride and there is obtained, after removal of the excess triallyl phosphite, the following compounds, respectively, (a)
$$Cl_2C_6H_3CH_2\overset{O}{\underset{\|}{P}}(OCH_2CH=CH_2)_2$$

(b)
$$Cl_3C_6H_2CH_2\overset{O}{\underset{\|}{P}}(OCH_2CH=CH_2)_2$$

(c)
$$Cl_4C_6HCH_2-\overset{O}{\underset{\|}{P}}(OCH_2CH=CH_2)_2$$

(d)
$$Cl_5C_6CH_2\overset{O}{\underset{\|}{P}}(OCH_2CH=CH_2)_2$$

EXAMPLE XVII

One hundred seventy-six (176) parts of para xylyl chloride and 50 parts of triallyl phosphite are reacted by the procedure of Example XV, and after removal of the excess paraxylyl chloride there is obtained as a residue the compound p-$ClCH_2C_6H_4CH_2P(OCH_2CH=CH_2)_2$.

EXAMPLE XVIII

Two hundred forty (240) parts of commercially available "polychloromethyl naphthalene" having an average of 3 aromatic chlorine atoms in the naphthalene nucleus, $Cl_3C_{10}H_4CH_2Cl$, are reacted with 410 parts of triallyl phosphite by the procedure of Example XV and there is obtained an undistilled viscous residue of the compound $$Cl_3C_{10}H_4CH_2\overset{O}{\underset{\|}{P}}(OCH_2CH=CH_2)_2$$

EXAMPLE XIX

Example XV is repeated using 312 parts of tetrachloroxylyl dichloride (prepared by the chlorination of

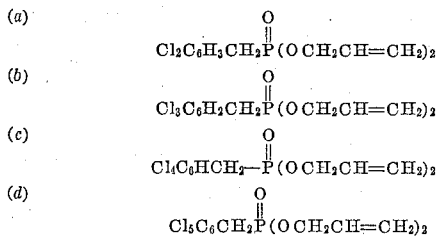

in the presence of ultraviolet light) instead of p-chlorobenzyl chloride, and there is obtained the compound

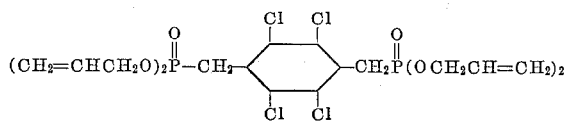

EXAMPLE XX

One hundred seventy-six (176) parts of p-xylyl dichloride, 810 parts of triallyl phosphite are mixed and reacted at 130–160° C. for 5 hours, or until no more allyl chloride is liberated and the excess triallyl phosphite is removed from the reaction mixture at a reduced pressure of 55 mm. leaving substantially pure, viscous, almost water white $$p\text{-}(CH_2=CHCH_2O)_2\overset{O}{\underset{\|}{P}}-CH_2C_6H_4CH_2\overset{O}{\underset{\|}{P}}(OCH_2CH=CH_2)_2$$

which is not distillable at 0.5 mm. up to 200° C. but can be distilled in a molecular still to a water white product. Analysis of the product for P showed a 14.46% value which is in good agreement with the theoretical value of 14.51% P.

The use of o-xylyl dichloride and m-xylyl dichloride produce the corresponding isomers. When a mixture of xylyl dichloride, obtained by dichloromethylating benzene according to the procedure given in Organic Reactions, I, 67 (1942), or a mixture of commercial xylyl dichlorides, obtained by chlorinating a m,p-mixture of xylene is used instead of p-xylyl dichloride, then an isomeric mixture of compounds corresponding to the formula $C_6H_4[CH_2P(OCH_2CH=CH_2)_2]_2$ is obtained.

Four hundred twenty-six (426) parts of this compound are dissolved in 800 parts of ethylene dichloride, and to this solution is added slowly 160 parts of bromine at room temperature, following which unreacted ethylene dichloride is removed at 15 mm. pressure, leaving the compound containing three polymerizable $CH_2=C<$ groups of the structure $$(CH_2=CHCH_2O)_2\overset{O}{\underset{\|}{P}}CH_2C_6H_4CH_2\overset{O}{\underset{\|}{P}}-OCH_2CH=CH_2$$
$$\overset{|}{O}CH_2CHBrCH_2Br$$

containing 15.7% bromine.

When 140 parts of chlorine instead of bromine are added there is obtained a compound containing two polymerizable $CH_2=C<$ groups and two $-CH_2CHClCH_2Cl$ groups with a chlorine content of 24.76% having the formula $$(CH_2=CHCH_2O)_2[-PCH_2C_6H_4CH_2P]$$
$$(OCH_2CHClCH_2Cl)_2$$

EXAMPLE XXI

Example XV is repeated using monomethyl diallyl phosphite instead of triallyl phosphite, and the same compound $$ClC_6H_4CH_2\overset{O}{\underset{\|}{P}}(OCH_2CH=CH_2)$$

is obtained.

EXAMPLE XXII

Example XIX is repeated using monoallyl dimethyl phosphite instead of triallyl phosphite, and there is obtained the compound

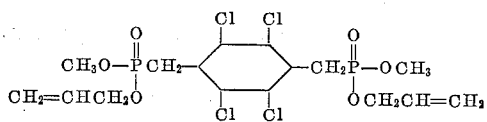

When diallyl monophenyl phosphite or monomethylmono-phenylmono-allyl phosphite is used instead of triallyl phosphite, there is obtained the compound

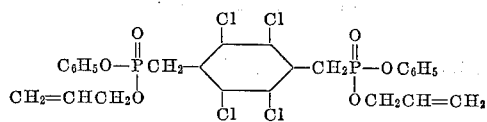

EXAMPLE XXIII 2,2'-dichloro-4,4'-di-(chloromethyl)biphenyl (prepared by the chloromethylation of 2,2'-dichloro-biphenyl) by the procedure given in Organic Reactions I, 62 (1942), 322 parts are reacted with 810 parts of triallyl phosphite according to the procedure of Example XV and there is obtained

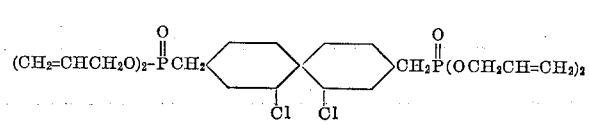

EXAMPLE XXIV

Example XXIII is repeated using 340 parts of 3,3'-dichloro-4,4'-dichloromethyl diphenyl oxide (prepared by the chloromethylation of 3,3'-dichloro-diphenyl oxide by the procedure given in Organic Reactions, I, 62 (1942), instead of the biphenyl compound and there is obtained the compound

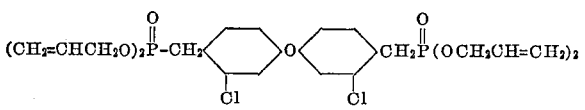

whereas when an equivalent amount of the corresponding diphenyl amine, and the corresponding diphenylsulfide respectively (prepared by chloromethylating the corresponding diphenyl amine or sulfide instead of the dichloro diphenyl oxide) are used, the corresponding compounds are obtained, respectively:

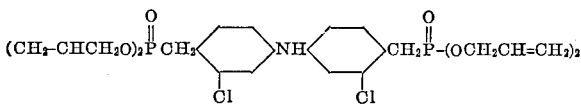

and

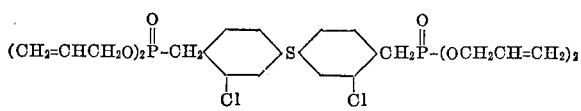

EXAMPLE XXV

The following compounds are converted to the chloromethyl derivatives by the procedure given in Organic Reactions, I, 67 (1942), and reacted with unsaturated phosphite esters by the procedure of Example XV to give the corresponding phosphonium esters.

are reacted by the procedure of Example I with 540 parts of $P(OCH_2CH_2Cl)_3$ and there is obtained the compound

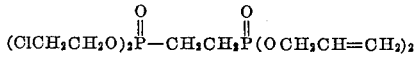

It has been discovered that the phosphonate monomers of this invention are especially useful for the preparation of copolymers with unsaturated alkyd resins. As is well known, copolymers of the unsaturated alkyd resins, for example, copolymers of styrene and glycol maleate have wide utility in industry for the preparation of reinforced laminates, radomes, etc. However, such products are limited in their applications by their poor resistance to heat, and are ineffective at relatively high temperatures.

Many attempts have been made to improve the heat resistance of such compositions, but with limited success. Some improvement is achieved by the use of divinyl benzene, diallyl phthalate, and the like, instead of the styrene, but the degree of improvement is not commensurate with the added cost of such more expensive monomers. Furthermore, the use of such monomers does not improve the solvent resistance of the copolymer to aromatic hydrocarbons, or such active solvents as ketones and esters, nor do they reduce their combustibility, or produce copolymers which are self-extinguishing.

Trialkyl cyanurate has been proposed for copolymers with unsaturated alkyd resins to produce materials that withstand temperatures in excess of 200° C. (Modern Plastics, vol. 29, No. 11, p. 116 (1952). However, such copolymers cure very slowly requiring curing at 175–200° F. followed by postcuring at 400°–500° F. for 24 hours,

| Starting Compound | Intermediate | Monomer |
|---|---|---|
| 1. $CH_3COC_6H_3Cl_2$ | $CH_3COC_6H_2(Cl_2)CH_2Cl$ | $CH_3COC_6H_2Cl_2CH_2\overset{O}{\overset{\|}{P}}(OCH_2CH=CH_2)_2$ |
| 2. $Cl_2C_6H_3COOC_2H_5$ | $C_2H_5OOCC_6H_2(Cl_2)CH_2Cl$ | $C_2H_5OOCC_6H_2(Cl_2)CH_2\overset{O}{\overset{\|}{P}}(OCH_2CH=CH_2)_2$ |
| 3. $Cl_2C_6H_3COOCH_2CH=CH_2$ | $CH_2=CHCH_2OOCC_6H_2(Cl_2)CH_2Cl$ | $CH_2=CHCH_2OOCC_6H_2(Cl_2)CH_2\overset{O}{\overset{\|}{P}}(OCH_2C=CH_2)_2$ |
| 4. $Cl_2C_6H_3CON(CH_3)_2$ | $(CH_3)_2NOCC_6H_2(Cl_2)CH_2Cl$ | $(CH_3)_2NOCC_6H_2(Cl_2)CH_2\overset{O}{\overset{\|}{P}}(OCHCH=CH_2)_2$ with $CH_3$ |
| 5. $Br_2C_6H_2SO_2N(C_2H_5)_2$ | $(C_2H_5)_2NO_2SC_6H_2(Br_2)CH_2Cl$ | $(C_2H_5)_2NO_2SC_6H_2(Br_2)CH_2\overset{O}{\overset{\|}{P}}(OCH_2-\overset{Cl}{\overset{\|}{C}}=CH_2)_2$ |
| 6. $CH_2BrCHBrCOOC_6H_5$ | $CH_2BrCHBrCOOC_6H_4CH_2Cl$ | $CH_2BrCHBrCOOC_6H_4CH_2\overset{O}{\overset{\|}{P}}(OCH_2CH=CH_2)_2$ |
| 7. $C_6Cl_5C_6H_5$ | $C_6Cl_5C_6H_4CH_2Cl$ | $C_6Cl_5C_6H_4CH_2\overset{O}{\overset{\|}{P}}(OCH_2CH=CH_2)_2$ |
| 8. $C_6Cl_5C_6H_5$ | $C_6Cl_5C_6H_3(CH_2Cl)_2$ | $C_6Cl_5C_6H_3[CH_2\overset{O}{\overset{\|}{P}}(OCH_2CH=CH_2)_2]_2$ |
| 9. $ClC_6H_4CH=CHC_6H_4Cl$ | $ClC_6H_4CH=CHC_6H_3(Cl)CH_2Cl$ | $ClC_6H_4CH=CHC_6H_3(Cl)CH_2\overset{O}{\overset{\|}{P}}(OCH_2CH=CH_2)_2$ |
| 10. $ClC_6H_4CH=CHC_6H_4Cl$ | $CH_2ClC_6H_3(Cl)CH=CHC_6H_3(Cl)CH_2Cl$ | $[CHC_6H_3(Cl)CH_2\overset{O}{\overset{\|}{P}}(OCH_2CH=CH_2)_2]_2$ |
| 11. $I_2C_6H_3OC_6H_5$ | $I_2C_6H_3OC_6H_4CH_2Cl$ | $I_2C_6H_3OC_6H_4CH_2\overset{O}{\overset{\|}{P}}(OCH_2CH=CH_2)_2$ |
| 12. $Cl_2C_6H_4$ | $Cl_2C_6H_3CH_2Cl$ | $Cl_2C_6H_3CH_2\overset{O}{\overset{\|}{P}}-OCH_3$ with $OCH_2CH=CH_2$ |

EXAMPLE XXVI

Two hundred seventy (270) parts of the monomer of Example V

which requirements raise the costs of production and result in lower productivity. Furthermore, such compositions have numerous cracks and faults in their structure (Modern Plastics, p. 153, October 1957).

It has now been discovered that these problems can be eliminated by the use of the phosphonate monomers of this invention which together with the unsaturated alkyd give copolymerizable mixtures which have rapid rates of polymerization, together with high heat resistance, allowing such products to be used at relatively high temperatures.

Also, if solvent resistance is desired, this can be achieved by increasing the nitrogen content or the hydroxyl content in the monomer in the groups attached to the phosphonate nucelus. Self-extinguishing properties, in combination with heat resistance and solvent resistance, are accomplished by the halogen content and phosphorus content of the monomers of this invention. Thus, with the new phosphonate monomers of this invention, a host of new useful compositions can be prepared.

As indicated above, the monomers of this invention are particularly useful in the preparation of copolymers with unsaturated alkyd resins. In carrying this portion of the invention into effect, an esterification product of a polyhydric alcohol and an alpha, beta, unsaturated polycarboxylic acid is first prepared in accordance with techniques now well known to those skilled in the alkyd resin art. Any polyhydric alcohol containing at least two esterifiable aliphatic hydroxy, groups, or mixtures of such alcohols, can be used in preparing the unsaturated alkyd resins. Examples of such polyhydric alcohols are ethylene glycol, di-, tri-, and tetra-ethylene glycols, thio diglycol, glycerine, pentaerythritol, 1,4-dihydroxy butene-2, etc. Any alpha-unsaturated, alpha,beta-polycarboxylic acid, or mixtures of such acids, can be reacted with the polyhydric alcohol or alcohols to form the unsaturated alkyd resin. Examples of such polycarboxylic acids are maleic, monohalomaleic, fumaric, monohalofumaric, citraconic, mesaconic, acetylene dicarboxylic, aconitic, etc., itaconic and its homologues, as, for instance, alpha methyl itaconic acid, alpha,alpha-dimethyl itaconic acid, etc. Anhydrides of these polycarboxylic acids can also be employed.

In some cases, instead of using an unmodified alkyd resin, an unsaturated alkyd resin can be used which has been internally modified by replacing a part, say up to about 75 mole percent of the unsaturated polycarboxylic acid with saturated aliphatic polycarboxylic acids, such as succinic, adipic, glutaric, pimelic, sebacic, azelaic, suberic, tricarballyic, etc. or with aromatic polycarboxylic acids, e.g. phthalic, benzoyl phthalic, terephthalic, benzophenone dicarboxylic, etc. Such acids also can be considered as being non-ethylenic polycarboxylic acids.

Anhydrides of these acids, if available, can also be used. The term "polycarboxylic acid" as used generally herein is intended to include within its meaning the anhydrides of the acids.

The esterification products of polyhydric alcohols with ethylenic polycarboxylic acids, or with ethylenic and non-ethylenic polycarboxylic acids, can be further modified by introducing as a reactant in the preparation of the alkyd resin, a non-esterifiable compound or compounds, more particularly a saturated or unsaturated normal or isomeric monohydric alcohol, or mixtures thereof, a saturated or unsaturated monocarboxylic acid, or mixture thereof, or both such esterifiable monohydroxy organic compounds, as well as by the use of hydroacids. Examples of monohydric alcohols which can be used as modifiers of the alkyd resin are propyl, isopropyl, butyl, isobutyl, amyl, isoamyl, hexyl, octyl, decyl, dodecyl, tetradecyl, cetyl, octadecyl, allyl, methallyl, 1-chlorallyl, 2-chlorallyl, crotyl, cinnamyl, 2-hydroxy-butene-1, etc. The use of methyl and ethyl alcohol is not precluded, but in general these alcohols are less satisfactory because of their lower boiling points. As monobasic acids can be used, for example, the unsubstituted saturated and unsaturated normal or isomeric monocarboxylic acids containing only one esterifiable group, such as acetic, propionic, butyric to stearic, inclusive, benzoyl, acrylic, methacrylic, cinnamic, etc., acids of drying, semi-drying, and non-drying oils, e.g., the acids of tung oil, linseed oil, soya bean oil, castor oil, etc. The monoesterifiable compounds can be introduced into the esterification before, during, or after the esterification of the polyhydric alcohol with the polycarboxylic acid under conditions that interesterification of the monoesterifiable compound with the incompletely esterified polyhydric alcohol-polycarboxylic acid product is attained. That is, the monoesterifiable compound is introduced into the reaction mass before all of the acid groups of the polyhydric acid, or all of the alcohol groups of the polyhydric alcohol have been esterified.

The term "unsaturated alkyd resins," as used generally herein and in the appended claims, is intended to include within its meaning both unmodified esterification products of a polyhydric alcohol with alpha-unsaturated, alpha, beta-polycarboxylic acid and esterification products of these components which have been modified, for example, as briefly described hereinabove.

To achieve copolymerization of the unsaturated alkyd resin with the phosphonate monomers of this invention, a solution or mixture of the unsaturated alkyd resin in the phosphonate monomer preferably is first effected. Copolymerization of the components of the mixture is achieved rapidly and advantageously by the use of a small amount of a polymerization catalyst. Examples of polymerization catalysts which can be used are ozone, ozonides, inorganic super-oxides, such as barium peroxide, sodium peroxide, etc. aliphatic alkyl and acyl peroxides, e.g. butyl tertiary peroxide, acetyl peroxide, lauryl peroxide, sterayl peroxide, etc. peroxides of the aromatic acid series, e.g. benzoyl peroxide, phthalyl diperoxide, etc., various per-compounds, such as, perborates, persulfates, perchlorates, etc., aluminum salts, such as the halides, organic and inorganic acids, such as methacrylic acid, hydrofluoric acid, etc., metal compounds of the saturated and unsaturated acid, such as, for instance, cobalt and manganese resinates, linoleates, maleates, etc.; or mixtures of these catalysts. Any suitable amount of catalyst can be used, but in general the catalyst concentration will be within the range of about 0.1 to about 4 percent by weight of the whole mass.

Copolymerization can also be effected by ionizing radiation, such as by atomic radiation from a reactor, or from cobalt 60, or by means of high energy electron generated by electron linear accelerators. When rapidity of interpolymerization between the phosphonate monomer and the unsaturated alkyd resin is of secondary importance, copolymerization between these components can be effected merely under the influence of heat, light, or heat and light, and in the absence of an accelerator of polymerization. When light is used as a catalyst, a ketone, such as acetone, acetophenone, etc., can be added to accelerate the photopolymerization. The rate of the copolymerization and some of the properties of the final properties vary with the time, temperature, and if a catalyst is used, also with the catalyst concentration. Copolymerization can be effected at or below room temperature, to temperatures above 100° C., for example, from about 130° C. to 150° C., or higher.

Typical examples of unsaturated alkyd resins are:

*Alkyd resin A.—Ethylene glycol itaconate*

| | Parts (by wt.) |
|---|---|
| Ethylene glycol | 23 |
| Itaconic acid | 52 |

The components are mixed and slowly heated in the course of one hour from room temperature to 190° C., in an inert nitrogen atmosphere, and held at this temperature for 3 to 5 hours.

*Alkyd resin B.—Ethylene glycol maleate*

| | Parts |
|---|---|
| Ethylene glycol | 31 |
| Maleic anhydride | 32 |

The components are mixed and heated as in the preparation of alkyd resin A to 180° C., and held at that temperature for 4 to 6 hours.

*Alkyd resin C.—Acetic acid-modified diethylene glycol maleate*

| | Parts |
|---|---|
| Diethylene glycol | 106 |
| Maleic anhydride | 88 |
| Acetic anhydride | 10 |

The ingredients are mixed together and refluxed for 1 hour in an inert nitrogen atmosphere after which the reaction mixture is brought to 190° C., with temperature is maintained for 4 to 6 hours.

It will be understood, of course, that this invention is not limited to the use of the specific unsaturated alkyd resins mentioned above and that a broad modification of the nature of the copolymer is possible by using the various phosphonate monomers with other unsaturated alkyd resins or mixtures of such resins. As illustrative examples of other unsaturated alkyd resins, the following esterification products can be used.

| Alkyd Resin | Components (parts) |
|---|---|
| D | Diethylene glycol (160)-maleic anhydride (147). |
| E | Diethylene glycol (106)-itaconic acid (130). |
| F | Glycerine (18.4)-itaconic acid (30.0). |
| G | Glycerine (20)-itaconic acid (29)-phthalic anhydride (11). |
| H | Ethylene glycol (20)-maleic anhydride (29.4)-succinic acid (3.3). |
| I | Diethylene glycol (30.6)-maleic anhydride (17.6)-itaconic acid (15.6). |
| J | Diethylene glycol (30.3)-maleic anhydride (13.2)-phthalic anhydride (21.7). |

In many cases, instead of polymerizing a single phosphonate monomer with a single unsaturated alkyd resin, mixtures can be used of two or more phosphonate monomers with a single unsaturated alkyd resin, or a single phosphonate monomer with two or more unsaturated alkyd resins, or a mixture of two or more phosphonate monomers with two or more unsaturated alkyd resins.

In conjunction with the alkyd resins, other monomers can be used which are copolymerizable with the phosphonate monomers or with the unsaturated alkyd resin, or with both, for example, one or more phosphonate monomers can be used with one or more unsaturated alkyd resins together with styrene. In addition to, or in lieu of the styrene, another monomer, or mixture of monomers can be used, for example, the vinyl esters, i.e., vinylacetate, and the vinyl esters of saturated and unsaturated, aliphatic and aromatic, monobasic and polybasic acids, more specifically the vinyl esters of the following acids: chloracetic, propionic, bromopropionic, isobutyric, valeric, caprylic, capric, oleic, stearic, acrylic, methacrylic, crotonic, oxalic, malonic, succinic, glutaric, adipic, suberic, azelaic, phthalic, terephthalic, benzoylphthalic, benzophenone-2,4'-dicarboxylic acid, maleic, fumaric, itaconic, mesaconic, hexahydrobenzoic, citric, trimesic, etc., as well as the corresponding allyl methallyl, chlorallyl, etc. esters of the aforementioned acids.

Other suitable monomers are the acrylic and alkacrylic acids and their derivatives, such as their esters amides and corresponding nitriles, for example, acrylic acid, methyl acrylate, butyl acrylate, allyl acrylate, ethlene glycol diacrylate, acryonitrie, methacrylonitrile, methacrylic acid, methyl methacrylate, etc.; the itaconic acid monoesters and diesters, such as the methyl, ethyl, phenethyl, allyl, dimethallyl, the maleic and fumaric acid monoesters, diesters and their amide and nitrile compounds, such as, ethyl allyl maleate, fumaryl dinitrile, dimethallyl fumarate, etc.; the ethers, such as vinyl phenyl ether, methallyl allyl ether, vinyl aly ether, viny methallyl ether, allyl crotyl ether, vinyl crotyl ether, hydro quinone divinyl ether, propargyl allyl ether, divinyl methyl styrene, the o-, m-, and p-divenyl benzenes, vinyl-naphyl styrene, the o-, m-, and p-divinyl benzenes, vinyl naphthalene, diallyl naphthalene, dimethallyl carbazole, vinyl-pyridine, etc.; the polyolefins and their polymerizable derivatives, such as phenyl butadiene, chloroprene; low molecular weight polymers, such as the dimers, trimers, tetramers, etc. of butadiene, isoprene, etc.; cyanuric acid derivatives, such as diallyl cyanurate, triallyl cyanurate, trivinyl cyanurate, or in general, triazine compounds having at least one polymerizable or copolymerizable unsaturated group attached directly or indirectly to the triazine ring; as well as the partial, soluble or fusible polymers of the hereinabove listed monomers, etc.

The modified unsaturated alkyd resins of this invention can be used alone or with fillers, dyes, pigments, opacifiers, lubricants, plasticizers, natural and synthetic resins or other modifying bodies in, for example, casting, molding laminating, coating applications, and as adhesives, impregnants, and protective coatings.

In coating, impregnating and similar applications, the mixed monomeric or partially copolymerized materials, without added solvent can be applied to the object to the treated and polymerized, with or without the application of heat and pressure, to form the final insoluble polymeric compostion in situ. These new synthetic materials can be used as impregnants for many porous bodies, such as cork, pottery, felts, or fabricated bodies with interstices, such as the windings of electric coils, netted fibers, interwoven fiburous cotton or glass materials, etc. They can also be used for the production of wire coatings and winding tapes, and for protectively coating imprevious articles, such as metals, or for coating and impregnating articles such as paper, wood, cloth, glass fibers in felted woven or other form, concrete, linoleum, synthetic boards, etc.

These new synthetic materials can also be employed in making laminated fibrous sheet materials wherein superimposed layers of cloth paper, glass fabrics or mats, etc. are firmly bonded together with these new compositions. Also, these new mixtures comprising at least one phosphonate monomer of this invention and at least one unsaturated alkyd resin, with or without modifying agents, can be cast or molded under heat or under heat and pressure. The solid and semi-liquid thermoplastic and thermosetting materials of this invention can also be molded by injection, extrusion, or compression molding techniques, or by contact or low-pressure methods, whereby they are converted into a variety of molded articles for industrial, household and novelty uses.

In preparing the interpolymerization products of the unsaturated alkyd resin and the copolymerizable phosphonate monomer, the unsaturated alkyd resin can constitute as much as 98 or 99 percent by weight of the whole. In other cases the phosphonate monomer alone, or admixed with other monomers, can constitute as much as 98 to 99 percent by weight of the whole. In general, the proportions of the components used in a particular formulation will depend upon the particular properties desired in the interpolymer. For most applications, it is preferred to use 30 to 90 percent of the unsaturated alkyd resin and from 10 to 70 percent of the phosphonate monomer, since within these ranges interpolymers best adapted for most commercial applications can be produced. Within these ranges the new interpolymers have a wide range of properties.

Depending, for example, upon the particular monomer or mixture of monomers used with the particular unsaturated alkyd resin, the particular proportions thereof, the conditions of polymerization, such as the temperature, time, pressure, presence or absence of catalyst, kind of catalyst used, if any, as well as the catalyst concentration, and the extent of polymerization, they can vary from soft flexible bodies to hard rigid masses of varying resistance to solvents. In the intermediate stages of copolymerization, some form fluid compositions of varying viscosities and may be se used. For coating or impregnating applications where the presence of a small amount of solvent in the cured composition is not objectionable, the mixed starting component can be diluted with volatile or non-volatile solvents or diluents best suited for the particular service application, and then can be polymerized after the application of the solution to the particular article to be coated or impregnated or impregnated and coated. By suitable selection of the starting material and the conditions of the interpolymerization, interpolymers can be obtained in an insoluble, infusible state practically resistant to the destructive effect of other chemical bodies, such as acid, bases, salts, solvents, swelling agents, and the like.

EXAMPLE XXVII

Forty (40) parts of a commercial sample of polyester of the $\alpha,\beta$-unsaturated dicarboxylic acid type, which is a phthalate acid modified polyethylene-maleate, is mixed with 60 parts of $Cl_3CP(OCH_2CH=CH_2)_2$ containing 0.5 part of tertiary butyl hydroperoxide and a small amount of cobalt activator (0.01 part) and let stand at room temperature for 4 hours and then heated at 50° C. for four hours, 60° C. for eight hours, and 80° C. for 10 hours; a hard flame-retardant insoluble, infusible crosslinked polymer is obtained.

Excellent results are obtained when the foregoing procedure is repeated using 60 parts of

as the phosphonium monomer.

The following phosphonate monomers of this invention are used in the subsequent examples with the alkyd resins described above.

| Phosphonate Monomer | |
|---|---|
| I | $Cl_3C \overset{O}{\underset{\|}{P}}(OCH_2C=CH_2)_2$ |
| II | $Br_3C \overset{O}{\underset{\|}{P}}(OCH_2C=CH_2)_2$ |
| III | $Cl_2CH \overset{O}{\underset{\|}{P}}(OCH_2\overset{CH_3}{\underset{\|}{C}}=CH_2)_2$ |
| IV | $Br_2CHCH_2 \overset{O}{\underset{\|}{P}}(OCH_2CH=CH_2)_2$ |
| V | $(CH_2\overset{O}{\underset{\|}{P}})_2(OCH_2CH=CH_2)_3$ <br> $OCH_2CHBrCH_2Br$ |
| VI | $Cl_2C_6H_3CH_2\overset{O}{\underset{\|}{P}}(OCH_2CH=CH_2)_2$ |
| VII | $Cl_2CHCH_2\overset{O}{\underset{\|}{P}}(OCH_2CH=CH_2)_2$ |
| VIII | $[-CHBrCH_2\overset{O}{\underset{\|}{P}}(OCH_2CH=CH_2)_2]_2$ |
| IX | $ClC_6H_4CH\overset{O}{\underset{\|}{P}}(OCH_2CH=CH_2)_2$ <br> $\underset{Cl}{\|}$ |
| X | $Cl_3C_6H_2CH_2\overset{O}{\underset{\|}{P}}(OCH_2CH=CH_2)_2$ |
| XI | $Cl_4C_6[CH_2\overset{O}{\underset{\|}{P}}(OCH_2CH=CH_2)_2]_2$ |
| XII | $C_6H_5CH(Br)CH_2\overset{O}{\underset{\|}{P}}(OCH_2CH=CH_2)_2$ |

EXAMPLE XXVIII

| | Parts |
|---|---|
| Alkyd resin B | 80 |
| Phosphonate monomer I | 20 |
| Benzoyl peroxide | 1 |

The alkyd resin B, the phosphonate monomer, and the benzoyl peroxide are thoroughly and uniformly mixed at room temperature. The mixture is then subjected to heat, specifically a temperature of 85° C. to 90° C. In 15 to 30 minutes the mixture is converted into an insoluble, infusible, extremely hard product. After 15 hours' heating, the resinous mass is only slightly harder than after one hour's heating. When the same mixture is heated to 130–150° C., it is converted to an insoluble, infusible mass in less than 60 seconds, usually between 30 and 45 seconds.

Fillers such as alpha cellulose, shredded cellulose derivatives, wood flour, asbestos, paper, cloth, etc., can be impregnated with the mixed unpolymerized or partially copolymerized components and the mass hardened under heat or under heat and pressure to yield molded articles of good appearance and excellent physical properties, and improved heat resistance.

To improve the heat resistance further, the foregoing procedure is repeated using a higher ratio of the phosphonate monomer to the unsaturated alkyd resin, as follows:

| | Parts |
|---|---|
| Alkyd resin B | 50 |
| Phosphonate monomer I | 50 |
| Benzoyl peroxide | 1 | and

| | Parts |
|---|---|
| Alkyd resin B | 75 |
| Phosphonate monomer I | 25 |
| Benzoyl peroxide | 1 |

The compositions of this example can be used as low temperature, low pressure laminating resins for the preparation of reinforced laminates from glass mat or fabric by using, instead of benzoyl peroxide, methyl ethyl ketone hydroperoxide and a room temperature activator such as cobalt acetate according to procedures well known in the art. Other catalysts that can be used in the products of this and the subsequent examples are: acetyl peroxide, diisopropyl benzene hydroperoxide, tertiary butyl hydroperoxide, t-butyl peracetate, t-butyl perbenzoate, cumene-hydroperoxide, cyclohexanone peroxide, di-tert.-butyl peroxide, hydroxy-heptyl peroxide, lauryl peroxide, permaleic acid, succinyl peroxide, dicumyl peroxide, dichlorobenzoyl peroxide, etc., and as accelerators may be used, benzene sulfinic acid, diethyl aniline, dimethyl p-toluidine, dimethyl o-toluidine, beta-hydroxyethyl aniline, phenyl-diethanolamine, tri-n-hexylamine, dodecyl mercaptan, etc.

It will be understood, of course, that this invention is not limited to the interpolymerization product of alkyd resin B, i.e., ethylene glycol maleate, and phosphonate monomer I given in the above illustrative example, and that any other phosphonate monomer of this invention can be used, e.g., phosphonate monomer II, phosphonate monomer III, phosphonate monomer IV, phosphonate monomer V, phosphonate monomer VI, phosphonate monomer VII, phosphonate monomer VIII, phosphonate monomer IX, phosphonate monomer X, phosphonate monomer XI, and phosphonate monomer XII.

Likewise instead of using ethylene glycol maleate, any other modified or unmodified unsaturated alkyd resin can be used, for example, alkyd resin A, alkyd resin B, alkyd resin C, alkyd resin D, alkyd resin E, alkyd resin F, alkyd resin G, alkyd resin H, alkyd resin I, alkyd resin J; etc.

Then the procedure of Example II is repeated using the following respective mixtures with one part of benzoyl peroxide:

| Alkyd Resin | Parts | Phosphonate Monomer | Parts |
|---|---|---|---|
| A | 75 | II | 25 |
| A | 50 | IV | 50 |
| A | 10 | V | 90 |
| B | 22 | I | 78 |
| B | 35 | III | 65 |
| B | 52 | VIII | 58 |
| C | 55 | X | 45 |
| C | 65 | IX | 35 |
| C | 77 | XII | 23 |
| D | 82 | VI | 18 |
| D | 90 | VII | 10 |
| D | 92 | XI | 8 |
| E | 99 | I | 1 |
| E | 97 | IV | 3 |
| E | 50 | II | 50 |
| E | 50 | VI | 50 |
| F | 40 | V | 60 |
| F | 60 | VIII | 40 |
| G | 70 | I | 30 |
| G | 75 | VI | 25 |
| G | 52 | II | 48 |
| G | 78 | VII | 22 |
| G | 37 | XII | 63 |
| H | 5 | V | 95 |
| H | 25 | II | 75 |
| H | 15 | VIII | 85 |
| H | 85 | III | 15 |
| H | 70 | IX | 30 |
| H | 73 | IV | 27 |
| I | 55 | X | 45 |
| I | 46 | VII | 54 |
| I | 12 | III | 88 |
| I | 81 | XII | 19 |
| J | 55 | V | 45 |
| J | 45 | XI | 55 |

In each case, the copolymerization produces an insoluble, infusible, heat resistant interpolymer.

Instead of copolymerizing a single phosphonate vinyl monomer and one unsaturated alkyd resin, a plurality of such phosphonate monomers can be polymerized with a single unsaturated alkyd resin or with a plurality of such resins. In this way, it is possible to obtain a composition comprising a mixture of interpolymers best adapted to meet a particular service application. The interpolymers of at least one phosphonate monomer and at least one unsaturated alkyd resin can be modified further by the addition of other vinyl monomers, such as the acrylates, methacrylates, styrene, the vinyl esters, the allyl esters, etc., as hereinbefore mentioned.

The respective mixtures indicated in the table below are reacted after one part of benzoyl peroxide is added by first dissolving it in the additional monomer, and the reaction mass heated to 100° C. for 5 hours.

| Alkyd Resin | Parts | Phosphonate Monomer | Parts | Other Monomer | Parts |
|---|---|---|---|---|---|
| B | 50 | I | 10 | Styrene | 40 |
| B | 40 | I | 30 | Divinyl benzene | 30 |
| B | 50 | II | 20 | Vinylacetate | 30 |
| B | 50 | III | 25 | Methyl methacrylate | 25 |
| B | 60 | VI | 15 | Acrylonitrile | 25 |
| B | 60 | VII | 10 | Divinyl benzene | 30 |
| A | 50 | IX | 25 | Diallyl phthalate | 25 |
| A | 50 | XI | 25 | Allyl methacrylate | 25 |
| A | 50 | XII | 30 | Ethyl acrylate | 20 |
| A | 50 | IV | 20 | Allyl acetate | 30 |
| A | 60 | VIII | 20 | Dimethyl itaconate | 20 |
| A | 60 | V | 20 | Diallyl maleate | 20 |
| A | 60 | X | 20 | Triallyl cyanurate | 20 |
| A | 60 | I | 20 | Phosphonate Monomer II | 20 |

EXAMPLE XXIX

A laminated product using the resin of Example XXVIII which contains equal parts of alkyd resin B and phosphonate monomer I, is prepared using 50 parts by weight of woven glass fabric and 50 parts of resin, and cured at 100° C. for 15 minutes, and post-cured at 150° C. for two hours. Similar products are prepared using in one case, styrene in place of the phosphonate monomer, and, in another case, triallyl cyanurate as the monomer. The product using the phosphonate monomer has less flammability, higher heat resistance, and higher solvent resistance than the corresponding product in which the phosphonate monomers of this invention are omitted.

EXAMPLE XXX

A molding composition is prepared using 70 parts of ground fibrous asbestos and 30 parts of the resin of Example XXVIII, containing 40 parts alkyd resin B, 30 parts of phosphonate monomer I, and 30 parts of divinyl benzene, and molded at 125° C. at 800 pounds sq. in. for four minutes, to produce a hard, heat-resistant molding. This compound is especially suited for use in electrical apparatus, such as heat-resistant electrical connectors, switch handles, electric toaster handles and controls, missile components, noses and guide fins, etc.

EXAMPLE XXXI

A molding composition is prepared by polymerizing a mixture of 0.4 part of $Cl_2CHP(O)(CH_2CH=CH_2)_2$ and 9.6 parts of diallyl phthalate, with 3 percent of benzoyl peroxide based on the combined weight. The mixture is placed in a glass-stoppered bottle and the air flushed from the bottle with a stream of nitrogen before the bottle is tightly stoppered and placed in an oil bath maintained at 85° C. for a period of 15 hours. The clear hard resin product shows remarkable resistance to flammability.

Similar results are obtained when an amount of a partial polymer of diallyl phthalate is used in place of the diallyl phthalate.

When these two procedures are repeated using 1 part of $ClCH_2P(O)(CH_2CH=CH_2)_2$ and 9 parts of the diallyl phthalate or the partial polymer, the resultant polymers when tested for flammability are self-extinguishing when removed from the flame. However, the resistance to flammability is much superior when the $$Cl_2CHP(O)(CH_2CH=CH_2)_2$$

monomer is used. This is particularly surprising in view of the fact that even a lower total chlorine content is present in the compositions using the lower amounts of the monomer of this invention.

While certain features of this invention have been described in detail with respect to various embodiments thereof, it will, of course, be apparent that other modifications can be made within the spirit and scope of this invention and it is not intended to limit the invention to the exact details shown above, except insofar as they are defined in the following claims.

The invention claimed is:

1. A composition of matter comprising the copolymerization product of a polymerizable mass comprising at least one unsaturated alkyd resin and at least one halogenated phosphonate monomer having at least two halogen atoms therein and having the formula

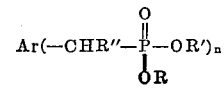

wherein

Ar is an aromatic radical having no more than 20 carbon atoms and selected from the class consisting of benzene, naphthalene, diphenyl and derivatives thereof having therein only derivative groups selected from the class consisting of hydrocarbon, halo, acyloxy, alkoxy and aryloxy groups;

n is an integer having a value of at least 1 and no more than 6;

R′ is an unsaturated radical of no more than 12 carbon atoms having a CH$_2$=C< group therein and being selected from the class consisting of unsaturated hydrocarbon groups and halogen derivatives thereof;

R″ is a radical selected from the class consisting of hydrogen and an alkyl group of no more than 6 carbon atoms;

R is a radical having no more than 20 carbon atoms therein selected from the class consisting of hydrocarbon radicals and derivatives thereof in which the derivative groups are selected from the class consisting of halogen, alkoxy, aryloxy, cycloalkoxy, acyloxy, cyano, carboxylate, carbamido, sulfamido and amino groups; and M is a radical selected from the class consisting of hydrogen, ammonium, amino and metal radicals, Ar, R and R′ being selected to provide at least 2 halogen atoms in the halogenated phosphonated monomer.

2. A composition of claim 1 in which the polymerizable mass comprises said alkyd resin and said phosphonate monomer has the formula $$C_6H_3(Br_2)CH_2\overset{O}{\underset{\|}{P}}(OCH_2CH=CH_2)_2$$

3. A composition of claim 1 in which the polymerizable mass comprises said alkyd resin and the said phosphonate monomer has the formula

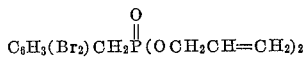

4. A composition of claim 1 in which the polymerizable mass comprises said alkyd resin and the said phosphonate monomer has the formula

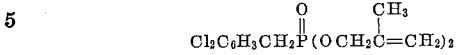

5. A composition of claim 1 in which the polymerizable mass comprises said alkyd resin and the said phosphonate monomer has the formula

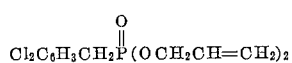

6. A composition of claim 1 in which the polymerizable mass comprises said alkyd resin and the said phosphonate monomer has the formula

References Cited by the Examiner

UNITED STATES PATENTS

| | | | |
|---|---|---|---|
| 2,577,796 | 12/1951 | Morris et al. | 260—956 |
| 2,714,100 | 7/1955 | Toy et al. | 260—461 |
| 2,867,610 | 1/1959 | Toy et al. | 260—870 |
| 3,157,685 | 11/1964 | Szabo et al. | 260—956 |
| 3,166,505 | 1/1965 | Kirby | 260—956 |
| 3,196,190 | 7/1965 | Nischk et al. | 260—869 |
| 3,210,442 | 10/1965 | Lundbery et al. | 260—870 |

MURRAY TILLMAN, *Primary Examiner.*

SAMUEL H. BLECH, *Examiner.*

J. T. GOOLKASIAN, *Assistant Examiner.*